Patented Feb. 8, 1944

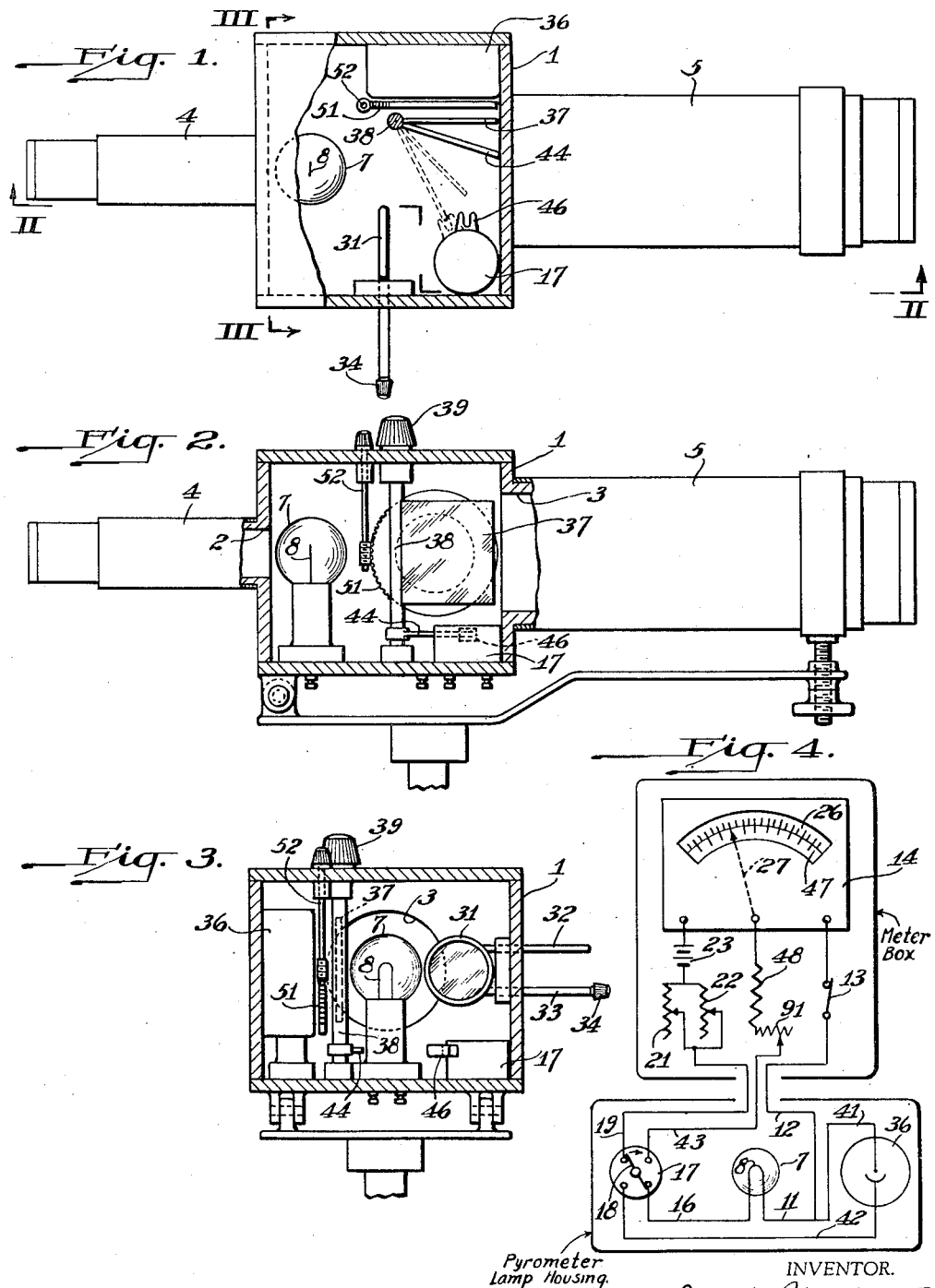

2,341,295

UNITED STATES PATENT OFFICE 2,341,295

PYROMETER APPARATUS

Erle I. Shobert, II, St. Marys, Pa., assignor to Stackpole Carbon Company, St. Marys, Pa., a corporation of Pennsylvania Application December 31, 1940, Serial No. 372,552

5 Claims. (Cl. 88—22.5)

This invention relates to pyrometers, and is a continuation-in-part of the subject matter of my copending patent application Serial No. 243,172, filed November 30, 1938, now Patent No. 2,230,438, for Pyrometer apparatus.

Optical pyrometers, which can be used when it is possible to measure temperatures by means of visible radiation, are probably the most accurate temperature-measuring devices there are for their range. However, as it is necessary to look through an optical pyrometer every time a temperature reading is desired, it has heretofore been impossible to use an optical pyrometer for continuously indicating, recording or controlling temperatures. On the other hand, radiation pyrometers can be used for all of these purposes, but they have such disadvantages as inaccuracy and difficulty of adjustment. Furthermore, the temperature reading scale used with a radiation pyrometer utilizing a photoelectric cell, particularly a self-exciting cell which does not have an external voltage source, is highly non-linear; that is, in calibrating the scale it is necessary to contract a large part of the temperature range into a very small part of the current ranges of the meter. Also, over a period of time the temperature indication tends to drift away from what it should be.

It is among the objects of this invention to provide pyrometer apparatus of the photoelectric cell type, which is capable of continuously indicating, recording or controlling temperatures, which is stable, and which uses substantially linear temperature-indicating scales.

In accordance with this invention a pyrometer is provided with radiation-sensitive means in the form of a photoelectric cell adapted to intercept rays radiating from a hot body to thereby control an electric current so as to give a continuous reading of the temperature of the hot body. To make the meter scale, which is operatively connected with the cell, linear and to assure a stable indication, a resistance element of several thousand ohms resistance is connected in series with the cell between it and the meter. Preferably, the cell is mounted in an optical pyrometer of the disappearing-filament type either permanently in the path of the rays from the hot body, with provision made for sighting past it in order to view the filament against the hot body, or the cell may be movable into and out of the path of the rays. In taking a reading with this pyrometer the hot body is first viewed through the pyrometer and the brightness of the filament of the lamp adjusted until the filament disappears. The reading of the meter scale connected in the lamp circuit is noted, and then the reading of the meter scale connected with the photoelectric cell is noted. If the latter reading does not correspond with the immediately preceding reading of the other scale it is adjusted or calibrated to make it agree. The second reading is then correct, and from then on the scale connected with the cell gives a continuous indication of the temperature of the hot body.

The invention is illustrated in the accompanying drawing in which Fig. 1 is a plan view of my pyrometer with the cover of the lamp housing broken away; Fig. 2 is a side view of the pyrometer with the lamp housing shown in section taken on the line II—II of Fig. 1; Fig. 3 is a vertical section through the lamp housing taken on the line III—III of Fig. 1; and Fig. 4 is a diagrammatic view showing the electric circuits by which the filament lamp and the photoelectric cell are connected to the meter.

Referring to Figs. 1 to 3 of the drawing, two opposite side walls of a lamp housing 1 are provided with axially aligned openings 2 and 3 from the first of which an adjustable ocular tube 4 projects and from the other of which an adjustable objective tube 5 extends. These tubes are provided with the usual lenses (not shown) whereby they form a telescope through which a body giving off visible light rays may be viewed. Mounted in the housing directly in front of the ocular tube opening is an incandescent lamp 7 having a filament 8 in the line of vision through the pyrometer. As shown in Fig. 4, one terminal of this lamp is adapted to be connected by wires 11 and 12 and switch 13 with a meter 14 of the type generally used with pyrometers. To complete the circuit, the other terminal of the lamp is connected by a wire 16 to a snap switch 17 having a bridging member 18 by which wire 16 is connected to a wire 19 that leads to rheostats 21 and 22. These rheostats are connected to one terminal of a battery 23 the opposite terminal of which is connected to meter 14. By adjusting the rheostats 21 and 22 the brightness of the lamp filament can be varied until it is the same as that of the hot body seen through the pyrometer, whereupon the filament disappears from view. Two rheostats are used in order to obtain a sufficiently fine adjustment of the current. Meter 14 is provided with a scale 26 and a pointer 27 that indicate the temperature of the hot body in accordance with the amount of current flowing through the meter and lamp circuit.

To prevent the filament from being burned out in attempting to make it disappear against an exceptionally hot body, an absorption screen 31 is mounted on the inner ends of a pair of rods 32 and 33 slidably mounted in the side wall of the lamp housing, as shown in Figs. 1 and 3. One of these rods is provided with a knob 34 by which the screen is moved inwardly between the lamp filament and objective tube 5 so as to decrease the intensity of the light rays coming from the hot body and against which the filament is matched.

A photoelectric cell 36 of the self-exciting or resistance blocking layer type is mounted in lamp housing 1 at one side of the line of vision therethrough and near the objective tube opening. To make it possible for the objective tube to direct the heat and light rays radiating from the hot body against this cell when desired, a mirror 37 is mounted on a vertical shaft 38 journaled in the top and bottom of the housing. This shaft is likewise disposed at one side of the line of vision through the housing, and is adapted to be turned by a knob 39 on its upper end so as to swing the mirror diagonally across the line of vision, as shown in dotted lines in Fig. 1. When in this position the rays radiating from the hot body and through the objective tube are intercepted by the mirror and deflected laterally against the photoelectric cell. As shown in Fig. 4, the cell is adapted to be connected by a wire 41 to wire 12 which leads to meter 14, and by a wire 42 to snap switch 17 in which bridging member 18 is adapted to connect it through a wire 43 to the meter.

It will be clear that the snap switch is used to switch the meter from the lamp circuit to the cell circuit when it is desired to change from an optical to a radiation reading. In order that this switching will occur automatically when the mirror is swung into or out of operative position, the lower end of mirror shaft 38 is preferably provided with a laterally projecting rigid arm 44 having a downturned outer end. This downturned end is adapted to engage the trigger 46 of snap switch 17 when the mirror is swung out of inoperative position (Fig. 1) in order to switch bridging member 18 from wires 16 and 19 to wires 42 and 43, i. e., from the lamp to the cell circuit. This arm, in connection with the trigger, may also serve as a stop for limiting the movement of the mirror away from the cell, its movement toward the cell being limited by engagement of the arm with the front wall of housing 1. Of course, any other suitable means may be used for limiting these movements of the mirror or for locking it in its two extreme positions.

For a purpose about to be described, the amount of current flowing in the meter and cell circuit can also be controlled manually. Preferably, this is done by controlling the amount of rays that can strike the photoelectric cell, such as by an iris 51 or the like mounted in front of the cell and manually controlled by turning a shaft 52 connected to it and projected upwardly through the top of the housing. Or, the function of the iris can be performed by a variable resistance 91 placed in the photoelectric cell circuit.

It is a feature of this invention that this apparatus indicates the temperatures of hot bodies on a linear scale 47, which directly adjoins scale 26 of the meter. In order to make possible the use of a linear scale with photoelectric cell 36, a resistance element 48 is connected in series in the cell circuit between the cell and meter, preferably in the meter box in wire 43. The resistance of element 48 must be sufficiently greater than the resistance of the meter and cell to make the relation between hot body temperature and photoelectric cell current substantially linear. The necessary resistance for this purpose depends in part upon the temperature range that is to be covered, but it should fall between 3000 and 20,000 ohms. For most purposes the resistance of element 48 should be between 4000 and 6000 ohms, because the ordinary commercial type of meter generally used with such apparatus has a resistance of about 500 ohms. Although the resistance of the cell has a bearing on the matter too that resistance varies considerably with different cells and with different light intensities. The range of cell resistance is taken into account by the above statement that the resistance of element 48 should be between 4000 and 6000 ohms. Element 48 also stabilizes the cell scale temperature indications by preventing pointer 27 from drifting. It will be understood that the advantages of such a resistance element in a photoelectric cell and meter circuit may be obtained even though the optical pyrometer feature is not used.

In using this pyrometer apparatus the pyrometer is first focused on the hot body, the temperature of which it is wished to know, knob 39 having previously been turned to swing mirror 37 out of the line of vision as shown in Fig. 1. This movement of shaft 38 causes arm 44 to actuate trigger 46 and thereby close the circuit between the lamp and meter (Fig. 4). Rheostats 21 and 22 are then manipulated to adjust the brightness of the lamp filament to the point where it disappears from view against the background which is the hot body. The current flowing through the lamp circuit causes pointer 27 to move along scale 26 to indicate the temperature of the hot body.

Knob 39 is then turned to swing mirror 37 across the line of vision through the pyrometer in order to deflect the rays radiating from the hot body against the photoelectric cell 36. This movement of the mirror causes arm 44 to operate snap switch 17 which thereupon opens the lamp circuit and closes the cell circuit. The rays striking the cell determine the amount of current that flows through the cell circuit and thereby determine the position of pointer 27 on scale 47. A reading of this scale is then taken, and if the temperature reading is not the same as the temperature reading taken a moment before from scale 26, iris 51 is adjusted to increase or decrease the amount of rays striking the photoelectric cell so that the current flowing through the cell circuit will swing pointer 27 to a point on scale 47 giving the same temperature reading as the reading taken from scale 26. After the radiation or cell reading has thus been corrected or standardized, the apparatus may be left to continuously indicate the temperature of the hot body. If desired, a recording meter can be used, or temperature-controlling apparatus can be connected with the pyrometer apparatus in any well-known manner.

Pyrometer apparatus constructed in accordance with my invention has the advantages of optical pyrometer accuracy and radiation pyrometer continuous indication, recording or controlling. The apparatus is simple and compact and can be quickly and easily operated. As the pyrometer is focused on exactly the same portion of the hot body for both the optical and radiation temperature readings, there can be no variation in these readings due to viewing different portions of the hot body. And of great importance is the fact that the scale 47 can easily be read for any temperature because a temperature difference of any given number of degrees at one end of the scale requires substantially the same length of scale as the same number of degrees at the other end of the scale.

According to the provisions of the patent statutes I have explained the principle and mode of operation of my invention and have illustrated and described what I now consider to be its best embodiment. However, I desire to have it understood that, within the scope of the appended claims, the invention may be practiced otherwise than as specifically illustrated and described.

I claim:

1. In pyrometer apparatus, a photoelectric cell responsive to rays radiating from a hot body and focused on the cell, electrical conductors connected to the cell and adapted to be electrically connected to a meter provided with a substantially linear temperature scale, and a resistance element of several thousand ohms connected to one of said conductors in series therewith, said resistance being sufficient to give a substantially linear relation between the temperature of the hot body and the current produced by said cell.

2. In pyrometer apparatus, a photoelectric cell responsive to rays radiating from a hot body and focused on the cell, an electric meter provided with a substantially linear scale, means for electrically connecting said cell to said meter, and a resistance element connected in series in said connecting means, said element having a resistance materially greater than the operating resistance of said cell and meter and sufficient to give a substantially linear relation between the temperature of the hot body and the current produced by said cell.

3. In pyrometer apparatus, a photoelectric cell responsive to rays radiating from a hot body, an electric circuit controlled by said cell and adapted to actuate a meter provided with a substantially linear scale, and a resistance element in said circuit in series with said cell, said resistance element having a resistance between 3000 and 20,000 ohms and sufficient to give a substantially linear relation between the temperature of the hot body and the current produced by said cell.

4. In pyrometer apparatus, a resistance blocking layer type of photoelectric cell responsive to rays radiating from a hot body, an electric circuit controlled by said cell and adapted to actuate a meter provided with a substantially linear scale, and a resistance element in said circuit in series with said cell, the resistance of the meter being about 500 ohms and said resistance element having a resistance between 4000 and 6000 ohms and sufficient to give a substantially linear relation between the temperature of the hot body and the current produced by said cell.

5. In pyrometer apparatus, a photoelectric cell responsive to rays radiating from a hot body and focused on the cell, an electric meter provided with a substantially linear scale, means for electrically connecting said cell to said meter, and a resistance element connected in series in said connecting means, the total resistance of said element and meter being greater than the operating resistance of said cell and sufficient to give a substantially linear relation between the temperature of the hot body and the current produced by said cell.

ERLE I. SHOBERT, II.